Dec. 30, 1930. O. L. WARD 1,787,057
PRUNING SAW
Filed Sept. 26, 1929
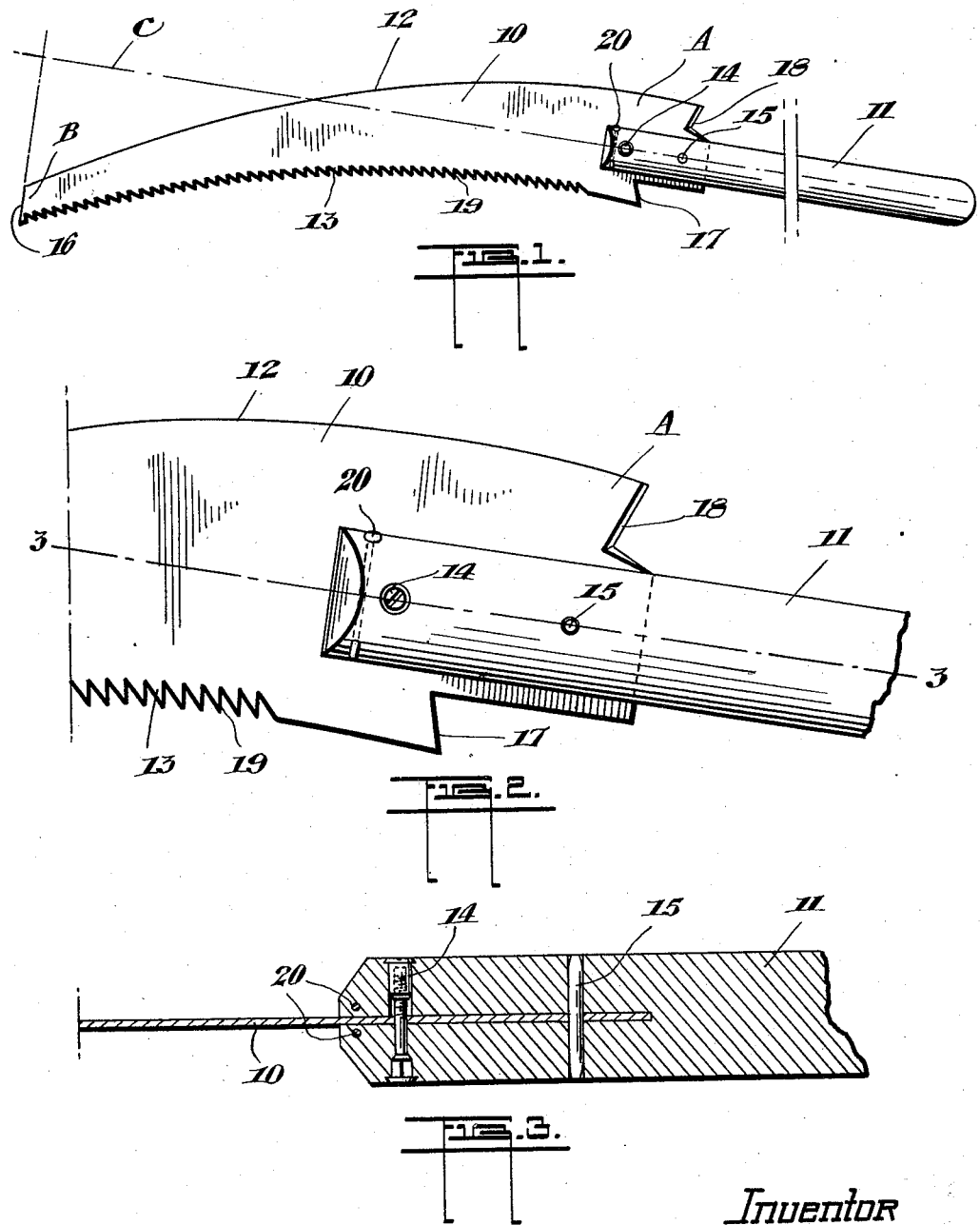
Inventor
Ottomar L. Ward.
BY
Attys.

Patented Dec. 30, 1930

1,787,057

UNITED STATES PATENT OFFICE

OTTOMAR LLEWELYN WARD, OF WATERVILLE, NOVA SCOTIA, CANADA

PRUNING SAW

Application filed September 26, 1929, Serial No. 395,422, and in Canada June 10, 1929.

This invention relates to improvements in pruning saws and the object of the invention is to provide an improved pruning saw which will be of simple and inexpensive construction, which will be light, strong, serviceable, durable and efficient in operation, and which will enable pruning operations to be carried out expeditiously and more conveniently than with similar types of saws.

A further object is to provide a saw of this type which will have many advantages over similar implements used for this purpose.

The invention consists in the construction and arrangement, all as hereinafter more particularly described, and illustrated in the accompanying drawings, in which Figure 1 is a side view of a pruning saw constructed in accordance with the present invention, the handle being broken intermediately.

Figure 2 is an enlarged view of a portion of the handle and blade of the improved implement showing the manner in which the blade is attached to the handle and the formation of the blade adjacent to the handle.

Figure 3 is a section on the line 3—3 of Figure 2.

In the drawings like characters of reference indicate corresponding parts in the different views.

The improved saw comprises the blade 10 and the handle shaft 11, the handle 11 being in the form of a long wooden rod which is of any convenient length and may be from six to nine feet long.

The blade 10 is curved longitudinally and tapers in depth from its inner end A to its outer end B, the inner end A being of greater width than the handle 11 so that when secured to the handle the blade projects at each side of the handle. The body of the blade 10 is formed with a convex back edge 12 and a concave cutting edge 13.

Adjacent to the inner end of the blade are two longitudinally spaced orifices. The end of the handle 11 is slotted to receive the end of the blade and adjacent to the end of the handle are two spaced orifices adapted to register with the orifices in the blade. The blade is secured to the handle by means of a bolt 14 which engages within one set of said registering orifices, the head of this bolt being depressed within the surface of the handle. Within the other set of registering orifices is driven a pin 15 which has a wedging action and serves very securely to position the blade with respect to the handle.

The handle 11 extends longitudinally from one end of the blade, the curvature of the latter being such that the outer end of the cutting edge 16 is offset laterally a desired distance from the center line C of the handle which distance is arranged so that the most efficient cutting action will be obtained.

The front edge of the blade at the inner end adjacent to the handle, is notched or cut away to form a hook portion 17 which is inclined with respect to the handle and, it will be noted, is located close in to the handle. The rear end of the back edge of the blade is notched or cut away to form a V-shaped hook 18 which is sharpened to form a knife so that this portion 18 constitutes a combined hook and knife.

The saw teeth are so arranged that the rear or inner edges 19 thereof are perpendicular to the line of curvature of the cuting edge of the saw.

Extending through the end of the handle 11 and at each side of the blade is a rivet 20 which serves to protect and strengthen the handle.

In order that a pruning saw may combine convenience of operation with efficiency it is necessary that the saw be as light as possible and that it also be compact and both these important features have been incorporated in the present saw. It is necessary that the characteristics of the saw be such that it may be successfully and conveniently used for sawing branches without setting the branch into a swinging movement as this causes the saw to bind. Owing to the lightness of the present implement and the disposition of the cutting edge this desired result has been attained.

In using the saw the hook 17 is employed for withdrawing branches which have been cut and the combined hook and knife portion 18 is used both for cutting off small branches and for removing cut branches. These portions 17 and 18 are so disposed that they lie close in to the handle and therefore may be used without setting up undue strain in the saw. Furthermore owing to their compact disposition in the handle, they are not at all cumbersome to use and are not liable to become entangled or interfere with the cutting operation of the blade. Further these members 17 and 18 are practically in line with the handle so that they may be used with a straight pull in the most efficient manner.

The construction of the improved saw is such that there are no projecting parts thereon which will cut or scratch the bark in pruning, which cutting or scratching is highly undesirable.

The pin 15, which is driven in, acts as a wedge to hold the blade very securely in position and also facilitates the removal of the latter, since this pin may be readily driven out and the bolt 14 removed when desired.

The improved saw has been found in practice to be extremely convenient in use and highly efficient for the purpose intended and from the foregoing it will be evident that it provides an improved implement of this type whereby the objects set forth have been attained.

Various modifications may be made in this invention without departing from the spirit or the scope of the claim, and therefore the exact forms shown are to be taken as illustrative only and not in a limiting sense, and it is desired that only such limitations shall be placed thereon as are disclosed in the prior art or are set forth in the accompanying claim.

What I claim as my invention is:—

A pruning saw comprising a blade and a handle shaft secured to and extending longitudinally from the inner end of the blade, the inner end of said blade being wider than and projecting on both sides of said handle, the cutting side of said blade being cut away at said inner end to form a hook in the body of the blade and lying alongside said handle, the inner end of the non-cutting side of said blade being notched and sharpened to form a knife and means for securing said handle to said blade.

In witness whereof I have hereunto set my hand.

OTTOMAR LLEWELYN WARD.